United States Patent [19]
Crowley

[11] 3,857,915
[45] *Dec. 31, 1974

[54] EMBOSSED PLASTIC SURFACE COVERING AND METHOD OF PREPARING SAME

[76] Inventor: Richard P. Crowley, 125 High St., Boston, Mass. 02110

[ * ] Notice: The portion of the term of this patent subsequent to July 1, 1986, has been disclaimed.

[22] Filed: Feb. 22, 1972

[21] Appl. No.: 228,396

Related U.S. Application Data

[63] Continuation of Ser. No. 28,052, April 13, 1970, abandoned.

[52] U.S. Cl............ 264/52, 117/93.31, 161/DIG. 3, 264/45, 264/47, 264/48, 264/54
[51] Int. Cl...................... B29d 7/20, B29h 21/02
[58] Field of Search .................. 264/45, 47, 52, 48; 161/DIG. 3

[56] References Cited
UNITED STATES PATENTS

| | | | |
|---|---|---|---|
| 3,098,831 | 7/1963 | Carr............................. | 264/DIG. 18 |
| 3,098,832 | 7/1963 | Pooley et al................ | 264/DIG. 18 |
| 3,365,353 | 1/1968 | Witman....................... | 264/52 |
| 3,453,171 | 7/1969 | Crowley...................... | 264/52 |
| 3,538,204 | 11/1970 | Grubb et al................ | 264/54 |

OTHER PUBLICATIONS

Benning, Calvin J., "Plastic Foams: The Physics and Chemistry of Product Performance and Process Technology: Vol. II Structure Properties and Applications," New York, Wiley–Interscience, 1969, pp. 120–124. TP1183F6B45

*Primary Examiner*—Ronald W. Griffin

[57] ABSTRACT

A chemically embossed vinyl chloride resin sheet material is prepared by treating the gelled surface of a vinyl chloride resin plastisol containing a blowing agent with a liquid which contains a monomer subject to polymerization and a polymerization catalyst for said monomer, whereby on subsequent heating of the treated gelled vinyl chloride resin sheet material and decomposition of the blowing agent, full expansion of the sheet material is prevented by the polymerization of the monomer in the treated areas, thereby producing a chemically embossed product.

7 Claims, No Drawings

EMBOSSED PLASTIC SURFACE COVERING AND METHOD OF PREPARING SAME

BACKGROUND OF THE INVENTION

Methods of imparting an embossed appearance to a cellular sheet include both chemical and mechanical embossing methods. U.S. Pat. No. 3,365,353, issued Jan 23, 1968, hereby incorporated by reference in its entirety, describes an improved method of chemically embossing a vinyl chloride resin cellular sheet material. This method incorporates a monomer compatible with a plasticized vinyl chloride into plastisol which is formed into a gelled resin sheet. A liquid containg a catalyst that will effect polymerization of the monomer in the formed vinyl chloride resin sheet is then applied in a predetermined pattern to one surface of the sheet and the resulting sheet heated to fuse the plasticized resin, decompose the blowing agent and to polymerize the monomer only in those areas where the catalyst has been applied, thereby obtaining a chemically embossed sheet material.

This method has a number of serious disadvantages. One major disadvantage is the requirement that the monomer be present throughout the entire plasticized vinyl chloride resin sheet. Typically, in the preparation of floor tile, only a minor portion of the tile is desired to have an embossed surface, such as the grout lines in an artificial stone pattern; that is, a depressed area, for example, 5 to 30 percent. Consequently, a major portion of the monomer in the plasticized vinyl chloride sheet is not contacted by the polymerization catalyst and not used, but results in a higher cost for the entire product. Another disadvantage is that the monomer selected must be wholly compatible with all components throughout the vinyl chloride resin sheet, since it is present throughout the entire body of the sheet, which compatibility limits the number of monomeric materials to be employed.

A further disadvantage of the described method is that the monomer by being blended into the plasticized vinyl chloride resin sheet formulation prior to the application or polymerization catalyst is subject to premature polymerization, either through the heat of the blending, mixing or gellation process or by the presence of the materials in the formulation, such as, for example, the metal salt stabilizers or other additives which may catalyze or lower the polymerization temperature of the monomer used. In addition, the presence of unpolymerized monomers in those areas of the sheet which have not been contacted with the polymerization catalyst applied in the printing ink is subject to change in physical properties on storage and aging or in temperature variations due to its polymerization tendency so that the resulting cellular chemically embossed sheet material may thus become in time more inflexible.

Furthermore, the employment of the polymerization catalyst in a liquid carrier is not an entirely efficient method of promoting the polymerization, since such polymerization depends upon the penetration of the polymerization catalyst into the sheet and the relatively uniform concentration of the catalyst during such penetration. Also, it is known that the use of materials in combination with certain metal salt stabilizers may tend to alter the decomposition temperature of the chemical blowing agent employed in a plasticized vinyl chloride resin sheet. Accordingly, where the monomer contains free hydroxyl groups, the incorporation of the monomer into the vinyl resin formulation may lower the decomposition temperature of the blowing agent used. Consequently, the blowing agent will decompose at a lower temperature and the polymerization catalyst used may correspondingly have a lower effective temperature in order to polymerize the monomer prior to substantial decomposition of the blowing agent.

Accordingly, my invention is directed to an improved chemical method of imparting an embossed appearance to a cellular sheet and to the embossed sheet products produced, which method and product is an improvement over the disclosure of U.S. Pat. No. 3,365,353.

SUMMARY OF THE INVENTION

My invention is a continuation-in-part of my U.S. patent application Ser. No. 566,810, filed July 21, 1966, now U.S. Pat. No. 3,519,527, which application is a continuation-in-part of Ser. No. 541,100, filed Apr. 8, 1966, now U.S. Pat. No. 3,453,171.

My invention concerns a method of preparing a chemically embossed cellur sheet material, which method comprises: providing a sheet of a gas-expendable thermoplastic resin which contains a blowing agent subject to decomposition or expansion on heating; applying to the surface of the sheet a liquid containing a polymerizable material and a hardening agent adapted to polymerize such material and permitting the liquid to penetrate the sheet material to a desired depth; and thereafter, heating the treated sheet material to a temperature sufficient to decompose the blowing agent and to polymerize the polymerizable material, thereby producing a chemically embossed sheet material. Those areas of the sheet material which have been treated with the liquid composition will inhibit the full expansion of the sheet material on decomposition of the blowing agent and consequently represent those depressed or embossed areas of the resulting sheet product.

My method avoids the difficulties associated with the prior art, although, if desired, the use of a monomer throughout the entire thermoplastic sheet may be continued, but is not economical or an essential requirement of my method. My method permits the modification in alteration of the thermoplastic sheet material only in those particular areas and to the depth desired where the chemical embossing is required. My method is particularly adapted to the production of laminate-type sheet materials wherein the gas-expandable thermoplastic resin layer is cast or laminated onto a woven or nonwoven fibrous or nonfibrous supporting scrim or base sheet and where a clear transparent wear-resistant thin resin top layer is applied prior to creating the chemically embossed product. Such product is particularly adapted for use as a floor tile product, while when placed on a woven, knitted or stretchable fabric base may be employed as a wall or upholstery covering or for use in garments, boots, shoes, handbags and the like.

My invention in particular concerns the preparation of a chemically embossed cellular plasticized vinyl chloride sheet material, which method comprises casting a vinyl chloride resin plastisol containing azodicarbonamide as a blowing agent into a thin layer onto a supporting sheet material, heating the cast plastisol to a temperature insufficient to decompose the blowing agent but sufficient to form a gelled layer; e.g., 120°-160°C; printing onto the smooth, gelled plastisol surface a liquid composition which contains from about 5 to 50 percent of a monomer subject to additional polymerization and from about 2 to 25 percent of a polymerization catalyst of a free-radical type which, on heating, will effect polymerization of the monomer employed, the polymerization temperature being less than that of the temperature at which the blowing agent substantially decomposes; for example, less than 200°C or less than 170°C; permitting the printing ink composition to penetrate the gelled layer to the desired degree; and thereafter, heating the resulting treated product to a temperature of 170°-230°C to provide for fusion of the plasticized vinyl chloride resin to decompose the blowing agent and to polymerize the monomer employed in the printing ink composition in those particular areas where the printing ink was applied, thereby providing a cellular plasticized vinyl chloride resin to emboss the product.

The thermoplastic resin suitable for use in my invention includes, but is not limited to, those gas-expandable organic thermoplastic resinous materials, such as those polymers and copolymers of vinyl resins like vinyl chloride resins to include polyvinyl chloride and copolymers of vinyl chloride with short-chain fatty acids of vinyl esters, such as vinyl acetate or vinyldiene chloride, vinylbutylerate and such materials as well as elefinic resins, such $C_2$-$C_4$ olefinic resins of polypropylene, polyethylene, ehtylene-propylene copolymers and terpolymers and the like. The thermoplastic resins may be suitably plasticized, such as by the use of ester-type plasticizers like adipates, sebacates, phthalates and may contain those other additives normally employed, such as metal salt stabilizers, fillers, pigments, dyes, solvents, secondary plasticizers, viscosity control additives and the like. The selection of the blowing agent to be employed depends upon the melt viscosity index and other factors of the polymer, which blowing agents and their selection are well known.

My hardening agents comprise those materials, organic and inorganic, synthetic and natural, solid, liquid, vapor or radiant energy which induce or cause an increase in the thermoset properties or mechanically strengthen the treated areas of the thermoplastic sheet material. Typically, my hardening agents include those polymerization catalysts, polymerization initiators, reaction catalysts, curing agents, cross-linking materials, and such other materials which in combination with the polymerizable material used or with a component of the thermoplastic sheet material, such as the plasticizer or resin or a combination of all effect an increase in molecular weight and melt viscosity, such as caused by polymerization or condensation of a monomer or a resinous or polymeric material. Such hardening of the material in the thermoplastic sheet treated area inhibits the full expansion of the thermoplastic resin in the treated area and thereby provides for a chemically embossed sheet material.

Sufficient hardening agent should be employed to provide for the desired reaction, with additional agent to be avoided due to cost and possible deleterious effect. A typical liquid composition, such as a printing ink containing such material, would vary in amount depending on the polymerizable material employed but amounts of from about 2 to 25 percent by weight may be employed. If desired, all or a part of the hardening agent may be included in the thermoplastic sheet material where required, and only the polymerizable material placed on the treated areas. This technique may be employed with a hardening agent which performs another useful function on a sheet, such as a stabilizer, plasticizer and the like. Otherwise, this technique is also wasteful of the hardening agent.

Hardening agents which may be employed include, but are not limited to, peroxides, organic and inorganic, such as benzoyl peroxide, lauroyl peroxide, dicumyl peroxide; nitriles, such as azonitriles like azodiisobutyronitrile; curing agents and accelerators for synthetic and natural elastomers; such as sulphur, thiocarbamates and similiar materials; aldehydes like paraformaldehyde for completing the condensation reaction of phenol-formaldehyde novolaks; amines for effecting the curing reaction of a solid urethane resin; cross-linking materials like amino aldehydes such as melamine and divinylbenzene for use with carboxylated natural and synthetic latices and other materials. My hardening agents also include the use of radiant energy such as the use of electrical energy like micro waves or radiation energy such as infrared, ultraviolet or visible light and the employment of a beam of atomic or some atomic particles or energy such as the use of a beam of high energy electrons from a van der Graff accelerator to induce polymerization of the polymerizable components, such as a monomer which has been applied to a particular area.

My polymerizable materials comprise those materials which alone or in a liquid carrier will penetrate the thermoplastic sheet material and in cooperation with the use of a hardening agent as above react with the resin, plasticizer or other material in the sheet material or react with itself by a polymerization or similar reaction to provide more thermoset properties in the treated area, such as by increasing the melt viscosity index of the thermoplastic sheet resin material in that area and thereby preventing full expansion of the area upon expansion of the sheet through the expansion of the blowing agent or decomposition of the blowing agent. Such polymerizable material should cause such a change below or at or simultaneously with the substantial expansion of the sheet mat by the blowing agent; for example, with a vinyl chloride resin sheet material at a temperature of below about 200°C; for example, 140°-190°C.

Typically, the polymerizable material should not react readily at the temperature of use in the liquid carrier with the hardening agent; that is, it should not cause premature polymerization or condensation, or if it does, such reaction should be preventable by reacting or incorporating into the liquid carrier an inhibiting agent, such as from about 0.01 to 1.0 percent of a hydroquinone with an acrylic monomer to prevent such reaction at such temperatures. It is often desirable to incorporate the hardening agent or the polymerizable material in a separate liquid, such as resin binder or additional plastisol or solvent, just before use in the liquid carrier to prevent such premature reaction. Typical polymerizable materials which may be employed and practiced in my invention include monomers, such as those liquid acrylic monomers like acrylic acids and acrylic esters and ethers, such as 1,3-butylene glycol dimethacrylate, allyl acrylate, divinylbenzene, ethylene glycol dimethacrylate, diallylfumarate and acrylic acid and other such monomers containing double bonds, preferably at least olefinically unsaturated and capable of additional polymerization on the addition of a polymerization catalyst.

Other materials would include, but are not limited to: the liquid curable polyurethane resins prepared by the reaction of a diisocyanate and glycol and which are subject to curing by the use of an amine catalyst; condensational material such as phenolformaldehyde resinous novolaks which are subject to further condensation to a C stage by the addition of additional formaldehydes, such as paraformaldehydes or an aqueous formaldehyde solution; and natural synthetic elastomers in latex or organic solution form such as sytrene-butadiene-styrene resins, polystyrene and others subject to hardening by the use of a curing agent or cross-linking agent to include those carboxylated elastomers subject to curing by cross-linking agents; that is, those rubbers containing acrylates.

It is preferred to employ polymerizable materials which are compatible with the thermoplastic resin sheet material but is not wholly necessary where the incompatible material can be present in sufficient quantities to provide the desired effect on the treated areas caused by such incompatibility is desired. Polymerizable materials used in this manner often range in amounts from about 5 to 40 percent of the liquid carrier. In connection with this application, the term "polymerization" includes condensation, copolymerization, polymerization, curing and other such reactions.

Although my hardening agents and polymerizable material may be employed in bulk, it is often preferred to employ them in a liquid carrier, either as a dispersion, slurry or solution, emulsion and the like in order to permit a more rapid penetration of the materials into the treated areas. Typical liquid systems often employed would include a dispersing agent, such as an ester plastisol like a phthalate such as dioctylphthalate or in solvents such as acetone, esters and ethers and alcohol, such as methylethyl ketone, dioxane, tetrahydrafuran, hydrocarbons and chlorohydrocarbons.

Where the surface of the resin sheet material is to be printed, it is often desirable to accomplish both printing and treatment in the same step, and accordingly, liquid systems should include for printing ink compositions a resin binder, pigments, solvents, plasticizers, diluents, dyes and other additives, such as inhibitors. The type and nature of the liquid carrier employed should be selected in order to permit the desired penetration to the desired depth in the required production time. Often where time permits, deeper penetration and better embossing results may be obtained by aging the sheet prior to subsequent decomposition of the blowing agent and fusion of the resin.

EXAMPLES

For the purposes of illustration, only my technique will be described in connection with the chemical embossing of a plasticized vinyl chloride resin sheet material employing the following formulations:

Base Coat Formulation

| Base Coat Ingredients | Parts by Weight |
| --- | --- |
| Copolymer vinyl chloride-vinyl acetate (12%) | 50 |

-Continued
Base Coat Formulation

| Base Coat Ingredients | Parts by Weight |
| --- | --- |
| Polyvinyl chloride resin | 50 |
| Dioctylphthalate | 30 |
| Epoxidized soybean oil | 5 |
| Titanium dioxide pigment | 5 |
| Cadmium-zinc long-chain fatty soap stabilizer | 4 |
| Azodicarbonamide blowing agent | 4 |
| Liquid Carrier Formulation | |
| 1,3-butylene glycol dimethacrylate | 20 |
| Benzoyl peroxide | 10 |
| Resin binder (acrylic resin) | 25 |
| Methylethyl ketone | 10 |
| Dioxane | 40 |
| Pigments and dyes | 15 |
| Hydroquinone inhibitor | 0.1 |
| Top Coat Formulation | |
| Polyvinyl chloride resin | 80 |
| Dioctylphthalate | 20 |
| Dibutylphthalate | 5 |
| Barium Cadmium Organic soap stabilizer | 3 |
| Mineral Spirits | 15 |

The base coat formulation is cast onto a resin reenforced asbestos sheet material in a thin wet film layer of about 10 to 25 mils; for example, 12 mils, and then heated to a temperature sufficient to gel the plastisol without decomposition of the blowing agent; for example, 100° to 135°C; e.g., 120°C for 3 to 15 minutes, for example, 5 minutes. The liquid carrier composition is then prepared and the benzoyl peroxide employed in a methylethyl ketonedioxane solution and mixed therein just prior to use. The liquid carrier is then applied in a predetermined pattern to the top surface of the gelled vinyl chloride sheet and allowed to penetrate into the surface for approximately 1 to 10 minutes, while longer periods, 1 to 12 hours, are used for deeper chemical embossing. The treated sheet is then heated to a temperature of approximately 100° to 120° for 1 to 10 minutes in order to dry the liquid carrier. A top coat formulation is then cast in a thin wet layer from about 1 to 10 mils onto the treated gel surface and then the sheet material is heated in a hot-air oven containing infrared heaters to a temperature of 170° to 200°C for 3 to 10 minutes. Such heating decomposes the blowing agent and expands the sheet material into a cellular sheet product and provides for the fusion of the thermoplastic vinyl chloride resin and simultaneously polymerizes the monomer in the treated areas resulting in a sheet which is chemically embossed.

Having thus described my invention and the manner of using the same, what is claimed is:

1. A method of chemically embossing a gas-expandable vinyl-chloride resin sheet material, which method comprises:

a. applying to surface portions of said sheet material in a predetermined pattern an ester of acrylic acid and a peroxide cross linking agent which will cross-link said ester on heating; and b. heating the treated sheet material to a temperature sufficient to polymerize the ester by the cross-linking agent and to cause the sheet to expand, whereby the surface of the portion of the sheet material to which the unsaturated compound has not been applied rises above the level of the surface of the applied portions to form a chemically embossed product.

2. The method of claim 1 wherein the ester of acrylic acid is allyl acrylate.

3. The method of claim 1 wherein the peroxide cross-linking agent is benzoyl peroxide.

4. The method of claim 1 wherein said sheet material, prior to the applying step, is essentially free of any polymerizable materials therein.

5. The method of claim 1 wherein the ester is applied to the selected portions of the sheet material in a liquid printing ink.

6. The method of claim 5 wherein the printing ink contains the peroxide cross-linking agent.

7. The method of claim 5 wherein the printing ink contains from about 5 to 50 percent of the ester and about 2 to 25 percent of the peroxide.

* * * * *